Dec. 15, 1936.  W. H. BASELT  2,064,367
BRAKE
Filed Oct. 11, 1934  2 Sheets-Sheet 1
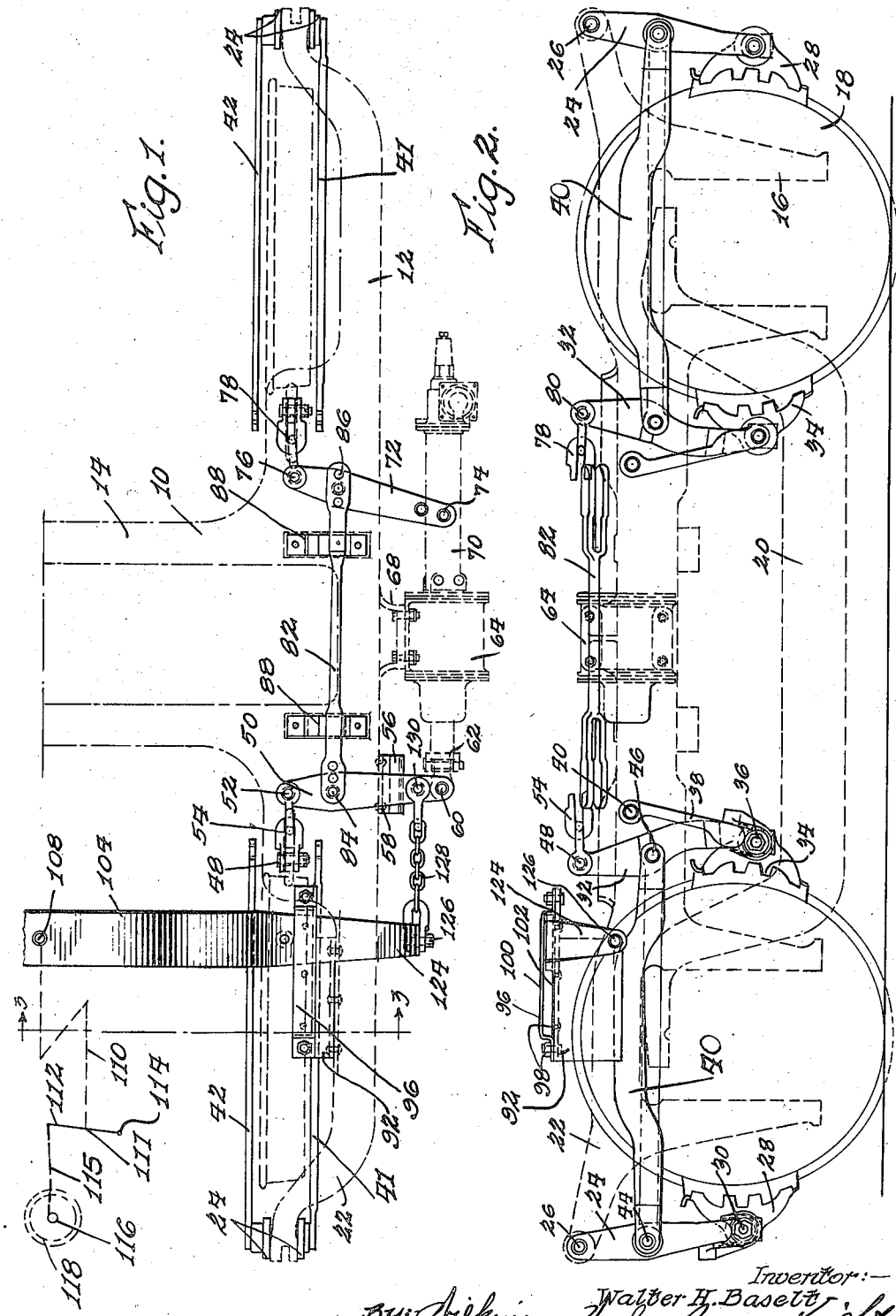
Inventor:—
Walter H. Baselt
By: Wilkinson, Huxley, Byron & Knight
Attys.

Dec. 15, 1936.  W. H. BASELT  2,064,367
BRAKE
Filed Oct. 11, 1934   2 Sheets-Sheet 2
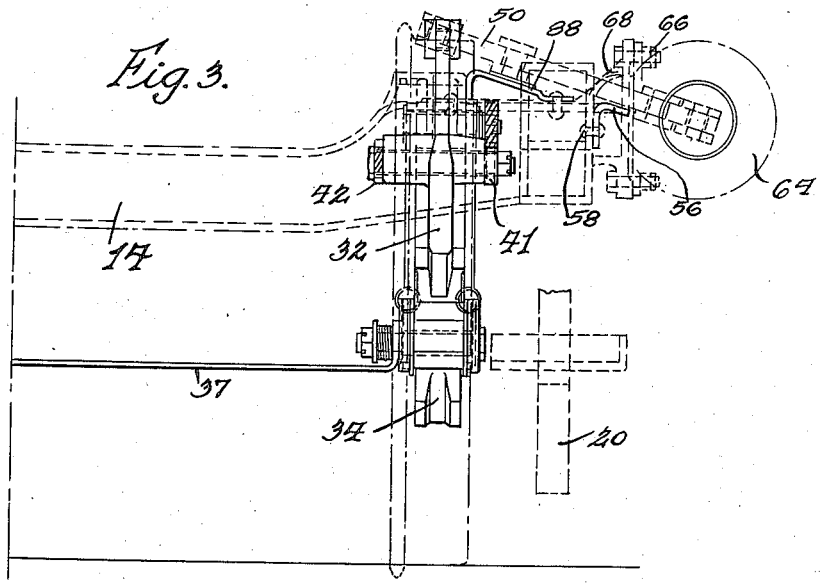
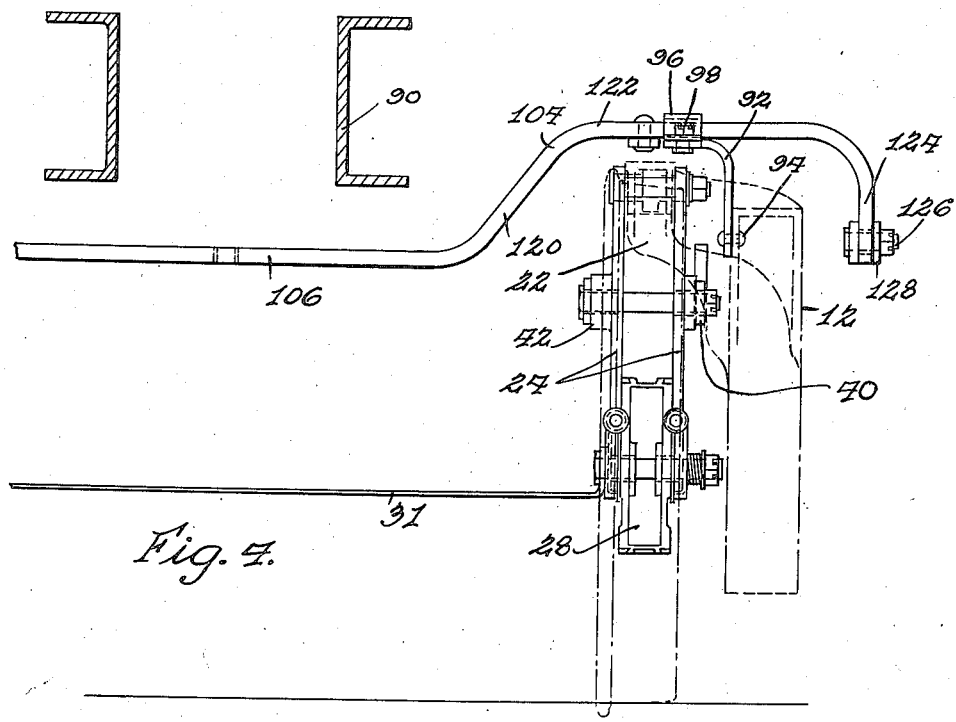
Inventor:—
Walter H. Baselt Patented Dec. 15, 1936

2,064,367

UNITED STATES PATENT OFFICE 2,064,367

BRAKE

Walter H. Baselt, Chicago, Ill., assignor to American Steel Foundries, Chicago, Ill., a corporation of New Jersey Application October 11, 1934, Serial No. 747,819

16 Claims. (Cl. 188—107)

This invention pertains to brake rigging for railway car trucks.

An object of this invention is to provide a type of brake rigging especially adapted to meet the conditions prevailing in railway cars having a low center of gravity, as for example, the present streamline type of train.

Another object of the invention is to provide a brake rigging in which the truck levers and tie rods are so arranged that they are prevented from falling on the rails should certain links or other connections fail.

Yet another object of the invention is to provide a brake rigging of simple construction which will be light in weight yet effective and positive in operation, and meets all conditions of manufacture and service.

Still another object of the invention is to provide an equalizer for a brake system wherein ample clearance is provided between the equalizer and the adjacent car body parts.

A further object of the invention is to provide a brake rigging having different types of brake operating mechanism connected therewith, one of said brake mechanisms being a hand brake mechanism, the equalizer between the hand brake and the brake rigging being so disposed as to provide ample clearance with respect to the associated car body parts, and wherein the equalizer performs the functions of a straight bar equalizer.

A different object of the invention is to provide an equalizer associated with a brake mechanism, the equalizer being so connected and disposed that no twisting of the equalizer will occur upon operation of the brake mechanism, and wherein the force delivered is in substantially the same horizontal plane as the connection between the equalizer and the associated brake arrangement.

A still different object of the invention is to provide a hand brake equalizer located as closely as possible to the cylinders of the brake operating mechanism.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a truck construction having brake mechanism applied thereto embodying the invention;

Figure 2 is a side elevation of the truck and brake construction illustrated in Figure 1;

Figure 3 is a transverse sectional elevation taken substantially in the plane as indicated by line 3—3 of Figure 1;

Figure 4 is a fragmentary end elevation of the truck and brake construction illustrated in Figure 1.

The truck construction illustrated consists essentially of the truck 10 provided with the side frame 12, the side frames on opposite sides of the truck being connected by the integrally formed transoms 14. The truck is of the pedestal type including the depending pedestal jaws 16 adapted to receive journal means such as the journal boxes (not shown) having cooperative engagement with the wheel and axle assemblies 18. The truck illustrated is a four-wheel truck, the journal means of the axles thereof being connected by means of the equalizer 20, the usual spring and bolster construction (not shown) being provided.

The side frame adjacent the ends thereof is provided with the brackets 22 extending substantially into the plane of the wheel treads and adapted to pivotally support the end dead truck levers 24 pivoted thereto as at 26. The lower ends of said dead truck levers are provided with the brake head and shoe assemblies 28 pivotally connected thereto as at 30, and provided with the tie bars 31 connecting brake heads on opposite sides of the truck. Intermediate live truck levers 32 are disposed between the wheels and are provided adjacent the lower ends thereof with the brake head and shoe assemblies 34 pivoted thereto as at 36 and provided with the transverse tie bars 37, brake hangers 38 also being pivotally connected to said shoes at 36 and pivotally supporting said brake heads and the associated mechanism on the side frame through the pivot 40.

The dead and live levers are disposed substantially in the plane of the wheel tread, and pairs of dead and live levers associated with each wheel are pivotally connected by means of the outer and inner straps 41 and 42 pivotally connecting said dead and live levers as at 44 and 46. The upper end of live truck lever 32, shown at the left end of said truck as viewed in Figures 1 and 2, is pivotally connected as at 48 to the inner end of the live cylinder lever 50 as at 52 through the clevis connection 54. The live cylinder lever 50 slopes outwardly and downwardly, and is slidably supported on the side frame through engagement with the bracket 56 secured on said side frame as at 58.

The outer end of the live cylinder lever is pivotally connected as at 60 to the piston rod 62 of the brake operating cylinder 64, said brake operating cylinder being connected as at 66 to the integral bracket 68 provided on the side frame adjacent the transverse center line thereof. The brake cylinder 64 has the slack adjuster 70 associated therewith, and the outer end of the dead fulcrum lever 72 is pivotally connected to said automatic slack adjuster as at 74. The inner end of said fulcrum lever is pivotally connected as at 76 through the clevis connection 78 to the other live truck lever 32, said truck lever being shown at the right of the truck construction illustrated in Figures 1 and 2, said clevis connection being pivoted to the upper end of said live truck lever as at 80.

The cylinder lever 50 and the fulcrum lever 72 are connected intermediate the ends thereof by means of the pull rod 82, said pull rod being pivotally and adjustably connected to the cylinder lever as at 84 and to the fulcrum lever as at 86. The truck side frame is preferably provided with the brackets 88 secured to said side frame and supporting said pull rod 82.

One of the difficulties encountered in applying brake cylinders to a truck, particularly a truck used with the present high speed cars where a low center of gravity is obtained, is the proper disposition and application of the hand brake connections because all passenger cars must be provided with adequate hand brakes. There are a number of factors which must be obtained in applying a hand brake to this type of car, namely, the connections must be simple yet effective, and at the same time a minimum weight is desirable. In a truck of this character used with the high speed car, the relation of the truck to the car center sills 90 is illustrated in Figure 4, and with the spring suspension it is of course necessary that the hand brake connections be applied in such a way as to permit substantially a relative vertical movement of five inches between the car body and the trucks.

With these conditions to be met, the equalizer guide bracket 92 is secured to the side frame as at 94 adjacent the wheel and axle assembly 18 which is located adjacent the live cylinder lever 50, said bracket extending upwardly and inwardly of the truck. An equalizer guide 96 is secured as at 98 to said equalizer bracket, said guide conveniently taking the form of a strap 100 and a bearing 102. The bearing 102 is adapted to slidably support the hand brake equalizer 104, the hand brake equalizer being of general U-shape and provided with the central portion 106 having the pin hole or other connection 108 disposed adjacent the longitudinal center line of the truck whereby a flexible connection, indicated generally by the dash lines 110, may be connected at one end to said pin hole and at the other end, as at 111, to the fulcrum lever 112 pivoted at one end as at 114 on the car body. The opposite end of the lever is flexibly connected by means, indicated generally by the dash lines 115, to the hand brake mast 116 provided on the car body, the hand brake connection being illustrated generally at 118.

This offset portion 106 is disposed an adequate distance below the center sills 90, and the hand brake equalizer 104 extends from said portion 106 upwardly as at 120 and outwardly as at 122, the portion 122 extending through the equalizer guide and thence being offset downwardly as at 124 outwardly of the truck frame. The offset portion 124 of the hand brake equalizer 104 is flexibly connected as at 126 through the clevis connection 128 to the live cylinder lever 50, being pivotally connected thereto as at 130. While the pivot 130 is shown as separate from the pivotal connection 60, it is of course understood that these pivot points may coincide. In either case, however, the point of applied force to the hand brake equalizer, i. e., at point 108, is substantially in the same horizontal plane as points of delivered force, i. e., 126—128—130. By this disposition of the parts, the hand brake equalizer is readily operable and has only a movement of translation, whereas if the points 108 and 130 were not substantially in the same plane, the equalizer would rotate on the guide 96 when the hand brake is applied.

With the hand brake connection shown, a similar action is effected on the brakes as that obtained by operation of the brake cylinder, that is, movement of the equalizer 104 toward the left of the truck as viewed in Figures 1 and 2 causes movement of the live fulcrum lever 50 in a clockwise direction about the pivot 84. Outward movement of the piston 62 causes a similar movement of the fulcrum lever. This movement of the fulcrum lever causes the upper end of the adjacent live truck lever 32 to move toward the right, as viewed in Figure 2, whereby pull rods or straps 41 and 42 cause application of the brake head 28 of the dead truck lever 24, and continued movement of the upper end of the live truck lever 48 causes movement of the live truck lever 32 about the fulcrum 46 to apply the brake head 34 to its braking position, as illustrated in Figure 2.

Continued movement of the outer end of the live cylinder lever 50 in a clockwise direction causes the cylinder lever to fulcrum about the point 52, whereupon the pull rod 82 causes movement of the dead fulcrum lever 72 in a counterclockwise direction about the pivot 74, so that the brake heads of the live and dead truck levers disposed at the right side of the truck are applied in a similar manner to the brake head and shoe assemblies 28 and 34 respectively. Release of the brake applying power causes release of the brake head and shoe assemblies through operation of the brake arrangement in an opposite direction to that described.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake rigging, the combination of a truck frame, wheels supporting said truck frame, live truck levers on one side of each wheel, connecting means between said live truck levers, dead truck levers on the other side of each wheel, tie straps connecting said truck levers on each side of each wheel and above the wheel centers, operating cylinder means connected to pairs of said live truck levers for controlling said rigging, and a hand brake equalizer slidably supported on said truck frame and having an offset end connected to said cylinder means substantially below the top of said side frame, said equalizer being offset inboard of said frame whereby the point of applied force thereto is substantially in the same horizontal plane as the connection to said cylinder means.

2. In a brake mechanism, the combination of a truck having a power operating means for said brake mounted on each of the side rails of said truck, a hand brake equalizer positioned on said truck and operably connected to said power operating means, said hand brake equalizer being offset to clear the wheels and car underframe, said offsets being arranged so that the applied and delivered forces are substantially in the same plane.

3. In a brake rigging, the combination of a truck frame, wheels supporting said truck frame, live truck levers on one side of each wheel, dead truck levers on the other side of each wheel, tie straps connecting the dead and live truck levers, cylinder levers in connection with said live truck levers, a connection between said cylinder levers intermediate the ends thereof, means on the truck frame intermediate the cylinder levers for actuating the cylinder levers, means for automatically adjusting one of said cylinder levers, and a hand brake equalizer supported on said truck and connected adjacent the ends thereof to one of said cylinder levers.

4. In a brake rigging, the combination of a truck frame, wheels supporting said truck frame, live truck levers on one side of each wheel, dead truck levers on the other side of each wheel, tie straps connecting the dead and live truck levers, cylinder levers in connection with said live truck levers, means on the truck frame intermediate the cylinder levers for actuating the cylinder levers, means for automatically adjusting one of said cylinder levers, a hand brake equalizer supported on said truck and connected adjacent the ends thereof to one of said cylinder levers below the top of said truck frame, and operating means for said equalizer connected thereto and disposed in substantially the same horizontal plane as the connection between said equalizer and said cylinder levers.

5. In a brake rigging, the combination of a truck frame, wheels supporting said truck frame, live truck levers on one side of each wheel, dead truck levers on the other side of each wheel, tie straps connecting the dead and live truck levers, cylinder levers in connection with said live truck levers, means on the truck frame intermediate the cylinder levers for actuating the cylinder levers, means for automatically adjusting one of said cylinder levers, an equalizer slidably supported on said truck frame, the ends of said equalizer being offset and connected to one of said cylinder levers adjacent the ends thereof, and operating means having an operating connection to said equalizer intermediate the ends thereof, said operating connection being disposed substantially in the same horizontal plane as the connection between said equalizer and said cylinder levers.

6. In a brake rigging, the combination of a truck frame, wheels supporting said truck frame, live truck levers on one side of each wheel, dead truck levers on the other side of each wheel, tie straps connecting the dead and live truck levers, cylinder levers in connection with said live truck levers, means on the truck frame intermediate the cylinder levers for actuating the cylinder levers, means for adjusting one of said cylinder levers, and an equalizer slidably supported on said truck frame, the ends of said equalizer being offset and connected to one of said cylinder levers adjacent the ends thereof, and operating means having an operating connection to said equalizer intermediate the ends thereof.

7. An equalizer for a brake mechanism including a bar having a central portion adapted for connection to operating means, said central portion merging into deflected portions merging into substantially horizontal bearing portions, said bearing portions being flanged to provide end connecting portions for brake mechanism, the connecting portion of the flanges being substantially coplanar with said central portion.

8. In a brake rigging, the combination with a truck frame, a plurality of truck levers, a tie rod connecting certain of said truck levers, other levers having pivotal engagement with certain of said truck levers, a bar connecting the last mentioned levers intermediate the ends thereof, one of said last mentioned levers being pivotally secured with respect to said truck frame, actuating means secured to the other of said last mentioned levers and disposed between said last named levers, and a hand brake equalizer slidably mounted on said frame adjacent said actuating means and connected adjacent an end thereof to one of said last mentioned levers.

9. In a brake rigging, the combination with a truck frame, a plurality of truck levers, a tie rod connecting certain of said truck levers, other levers having pivotal engagement with certain of said truck levers, a bar connecting the last mentioned levers intermediate the ends thereof, one of said last mentioned levers being pivotally secured with respect to said truck frame, actuating means secured to the other of said last mentioned levers and disposed between said last named levers, a hand brake equalizer slidably mounted on said frame adjacent said actuating means and connected adjacent an end thereof to one of said last mentioned levers, and a hand brake connection to said equalizer, said connection being substantially coplanar with the connection between said equalizer and its respective lever.

10. In a brake rigging, the combination with a truck frame, a plurality of truck levers, a tie rod connecting certain of said truck levers, other levers having pivotal engagement with certain of said truck levers, a bar connecting the last mentioned levers intermediate the ends thereof, actuating means connected to said last named levers and disposed therebetween, and a hand brake equalizer slidably mounted on said frame adjacent said actuating means and connected adjacent an end thereof to one of said last mentioned levers.

11. In a brake rigging, the combination with a truck frame, a plurality of truck levers, a tie rod connecting certain of said truck levers, other levers having pivotal engagement with certain of said truck levers, a bar connecting the last mentioned levers intermediate the ends thereof, actuating means connected to said last named levers and disposed therebetween, a hand brake equalizer slidably mounted on said frame adjacent said actuating means and connected adjacent an end thereof to one of said last mentioned levers, and a hand brake connection to said equalizer, said connection being substantially coplanar with the connection between said equalizer and its respective lever.

12. In a brake rigging, the combination with a truck frame, a plurality of truck levers, a plurality of other levers having pivotal engagement with the truck levers, a bar connecting said other levers intermediate the ends thereof, means actuating one of said other levers, said means being secured to said truck frame, and additional means disposed adjacent said truck frame for operating said brake rigging, said means including an equalizer, a hand brake connection to said equalizer, and a connection from said equalizer to one of said other levers and substantially in the plane of said first named connection.

13. In a brake rigging, the combination with a truck frame, a plurality of truck levers, a plurality of other levers having pivotal engagement with the truck levers, a bar connecting said other levers intermediate the ends thereof, means actuating one of said other levers, said means being secured to said truck frame, and additional means disposed adjacent said truck frame for operating said brake rigging, said means including an equalizer, a hand brake connection to said equalizer, and a connection from said equalizer to one of said other levers and substantially in the plane of said first named connection below the top of said truck frame.

14. In a car, the combination of a car body, a truck, a truck frame, spaced wheels cooperating therewith, a portion of said car body being below the top of said frame, dead levers pivoted to said truck at each end thereof adjacent and aligned with said wheels, live levers disposed adjacent said wheels on the opposite sides of said wheels from said dead levers, brake shoes provided for said dead and live levers and adapted to have braking cooperation with said wheels, pull rods connecting adjacent pairs of dead and live levers above the wheel centers, a dead lever pivoted adjacent one of said live levers and connected thereto, a live lever, means for operating said last named live lever, said last named live lever being connected to said last named dead lever and said other live lever, and means of different character than said first named means for operating said last named live lever, said means including an equalizer slidably mounted on said frame and offset below said car body.

15. In brake rigging, the combination of a truck frame, spaced wheels supporting said frame, brake mechanism on one side of the truck frame adapted to have braking cooperation with said spaced wheels, a live cylinder lever connected adjacent one end thereof to brake mechanism for one wheel, a dead cylinder lever connected adjacent one end to the brake mechanism of another wheel, a connection between cylinder levers intermediate the ends thereof, power operating means for said brake mechanism including a cylinder supported on said truck frame intermediate said cylinder levers, the piston of said cylinder being connected to said live cylinder lever adjacent an end thereof, and supplemental brake operating means connected to said live cylinder lever adjacent one end thereof, said supplemental brake operating means being slidably supported on said truck frame.

16. In brake rigging, the combination of a truck frame including side frames, wheels disposed to support said truck frame, brake mechanism adapted for braking operation of said wheels, an equalizer bar having downwardly extending end portions connected to said brake mechanism below the top of said side frames, said equalizer bar having a depressed portion intermediate said side frames disposed substantially in the plane of the connections from said end portions, and operating means connected to said depressed portion whereby the operation of said brake mechanism by said operating means is in substantially a single plane.

WALTER H. BASELT.